US011009782B2

(12) United States Patent
Yamashita (10) Patent No.: US 11,009,782 B2
(45) Date of Patent: May 18, 2021

(54) PROJECTION-TYPE DISPLAY DEVICE (71) Applicant: NEC Display Solutions, Ltd., Tokyo (JP)

(72) Inventor: Eisuke Yamashita, Tokyo (JP)

(73) Assignee: SHARP NEC DISPLAY SOLUTIONS, LTD., Tokyo (JP)

(*) Notice: Subject to any disclaimer, the term of this patent is extended or adjusted under 35 U.S.C. 154(b) by 0 days.

(21) Appl. No.: 16/324,531

(22) PCT Filed: Aug. 25, 2016

(86) PCT No.: PCT/JP2016/074855
§ 371 (c)(1),
(2) Date: Feb. 8, 2019

(87) PCT Pub. No.: WO2018/037539
PCT Pub. Date: Mar. 1, 2018

(65) Prior Publication Data
US 2019/0171092 A1   Jun. 6, 2019

(51) Int. Cl.
G03B 21/16   (2006.01)
G03B 21/14   (2006.01)
H04N 9/31   (2006.01)

(52) U.S. Cl.
CPC ........... *G03B 21/16* (2013.01); *G03B 21/145* (2013.01); *H04N 9/3144* (2013.01)

(58) Field of Classification Search
CPC ......... H04N 9/3144; H04N 9/31–3197; G03B 21/16; G03B 21/00–64
See application file for complete search history.

(56) References Cited

U.S. PATENT DOCUMENTS 6,758,565 B1 *   7/2004   Cobb ..................... G02B 13/22
                                                         348/E5.139
7,237,906 B2     7/2007   Morimoto et al.
(Continued)

FOREIGN PATENT DOCUMENTS

CN   1704839 A      12/2005
CN   101529330 A    9/2009
(Continued)

OTHER PUBLICATIONS

International Search Report (ISR) (PCT Form PCT/ISA/210), in PCT/JP2016/074855, dated Nov. 8, 2016.
(Continued)

Primary Examiner — Christina A Riddle
Assistant Examiner — Christopher A Lamb, II
(74) Attorney, Agent, or Firm — McGinn I.P. Law Group, P.L.L.C.

(57) ABSTRACT

A projection-type display device includes: a light source; a dust-proof case; heat-dissipating fins; a heat-dissipation fan that causes cooling air to flow into the heat-dissipating fins; a prism unit that is provided inside the dust-proof case and that separates light from the light source into a multiplicity of illumination light beams; an internal circulation fan; heat-receiving fins; and heat pipes that connect the heat-dissipating fins and the heat-receiving fins. The heat-receiving fins and the heat-dissipating fins are both formed in a substantially rectangular parallelepiped shape, each having, as cooling air inflow surfaces that are effective in heat dissipation or heat reception, a first surface and a second surface whose area is greater than the first surface. The cooling airflow inside the dust-proof case that is supplied by the internal circulation fan flows from the first and second surfaces of the heat-receiving fins.

15 Claims, 5 Drawing Sheets (56) References Cited

U.S. PATENT DOCUMENTS

| | | |
|---|---|---|
| 8,182,095 B2 | 5/2012 | Utsunomiya |
| 8,684,536 B2 | 4/2014 | Utsunomiya |
| 9,335,616 B2 | 5/2016 | Lin et al. |
| 9,713,282 B2 | 7/2017 | Mikawa et al. |
| 2008/0018553 A1* | 1/2008 | Umamine ............ H04N 9/3144 345/1.3 |
| 2008/0055563 A1* | 3/2008 | Momose ................ G03B 21/16 353/61 |
| 2009/0141247 A1* | 6/2009 | Oh ......................... G03B 21/16 353/61 |
| 2011/0157560 A1* | 6/2011 | Hsiao ..................... G03B 21/16 353/58 |
| 2015/0029472 A1 | 1/2015 | Lin et al. |
| 2017/0059973 A1* | 3/2017 | Yamaguchi ........ G03B 21/2033 |

FOREIGN PATENT DOCUMENTS

| | | |
|---|---|---|
| CN | 202444556 U | 9/2012 |
| CN | 203365896 U | 12/2013 |
| CN | 105324013 A | 2/2016 |
| CN | 105652573 A | 6/2016 |
| JP | 2003-337380 A | 11/2003 |
| JP | 2008-058626 A | 3/2008 |
| JP | 2010-107631 A | 5/2010 |
| WO | WO 2016/121028 A1 | 8/2016 |

OTHER PUBLICATIONS

Japanese Decision to Grant a Patent dated Dec. 10, 2019 for Japanese Patent Application No. 2018-536009 and English Translation thereof.
Chinese Office Action dated Oct. 28, 2020, in Chinese Patent Application No. 201680088741.7, with an English translation thereof.

* cited by examiner

PROJECTION-TYPE DISPLAY DEVICE

TECHNICAL FIELD

The present invention relates to a projection-type display device.

BACKGROUND ART

A projection-type display device is made up of a light source, an optical engine that, after light that is emitted from the light source has undergone optical processing by optical components such as lenses and mirrors, generates an image by means of image-generating elements (liquid crystal panel or DMD (Digital Micro-mirror Device)), and projection lens that enlarges and projects the image that was generated by means of the image-generating elements.

The light source conventionally uses a xenon lamp or a high-pressure mercury lamp but in recent years uses an LED (Light Emitting Diode) or LD (Laser Diode), whereby the light source lifetime, which is defined by a drop in the optical luminance of the light source, is five to ten times or more longer. Apart from the lifetime of the light-source, causes for a drop in the luminance of a projection-type display device include decrease of transmittance of the optical components due to the adhesion of dust, dirt, or soot in the air to the optical components or to the image-generating elements. In particular, when dust adheres to components such as image-generating elements in which light creates an image, the shape of the adhering matter results in defects that show up in the projected image. Still further, the irradiation of light upon dust or dirt generates heat which results in higher temperatures, and this leads to damage of the optical components and breakdown of the projection-type display device.

Extending the life of a light source results in an increase of the occurrence of decrease in luminance that results from the dust or dirt that adheres to an optical components or image-generating elements up until the light source reaches the end of its lifetime. In addition, the higher luminance of the projection-type display devices in recent years tends to facilitate the rise in temperature that results from adhered dust or dirt, and the previously mentioned decrease in transmittance, defects, and breakdowns become more likely to occur.

In order to prevent the decrease of transmittance and the occurrence of defects and breakdowns described above, dust and dirt must be kept from adhering to optical components and image-generating elements, and constructions are therefore being investigated that, by sealing the optical components and image-generating elements within a structural part, prevent the infiltration of dust and dirt contained in the air of the environment of the projection-type display device into the surroundings of the optical components or image-generating elements. In the interior of the sealed construction, the optical energy that is absorbed by the optical components and image-generating elements and the light energy of the unnecessary light that does not reach the projection screen result in the generation of heat, and this heat must be efficiently dissipated to the exterior of the sealed construction.

In the technology of discharging heat of a sealed construction, heat exchangers that use heat pipes are widely used. For example, Patent Document 1 (Japanese Unexamined Patent Application Publication No. 2010-107631) discloses a configuration in which the air intake port and air exhaust port of a projection-type display device are linked by a duct and a heat exchanger, in which fins are provided at both ends of the heat pipe, is installed inside the duct.

When the hot air that is exhausted from the air exhaust port passes through the fins inside the duct, heat is received by the fins. The heat is transferred to the fins outside the duct by means of the heat pipe and a fan sends air to the fins outside the duct to radiate the transferred heat. The temperature of the air that passes through the fins in the duct interior is decreased by radiating heart toward the outside of the duct exterior, the air then flows to the air intake port of the projection-type display device, becomes hot by cooling the parts inside the projection-type display device, and then is exhausted from the air exhaust port. The air intake port and air exhaust port of the projection-type display device and duct are sealed, and the air that is used for cooling circulates through the air intake port, the interior of the projection-type display device, the air exhaust port, and the duct, and the dust and dirt contained in the air surrounding the projection-type display device therefore do not infiltrate into the interior of the projection-type display device, and as a result, dust and dirt do not adhere to the optical components or image-generating elements.

LITERATURE OF THE PRIOR ART

Patent Documents

Patent Document 1: Japanese Unexamined Patent Application Publication No. 2010-107631

DISCLOSURE OF THE INVENTION

Problem to be Solved by the Invention

In the technology that is disclosed in Patent Document 1 mentioned above, since a heat exchanger and duct are provided in the periphery of the projection-type display device, the device is made large in size. The main factor that increases the size of the device is that the size of the duct space through which the air flows and that is provided before and after the heat exchanger fins is large. In addition, even if the surroundings of the air intake port, air exhaust port, and projection lens of the projection-type display device are sealed, the presence of any gaps in the case will allow the infiltration of the surrounding air together with dust and dirt through these gaps and into the projection-type display device, and dust and dirt will therefore adhere to the optical components or the image-generating elements. The outer enclosure of a case is usually made up of relatively large resin parts and sheet-metal parts and is consequently vulnerable to the occurrence of distortion, and gaps may therefore easily occur. In particular, projection-type display devices that are used in, for example, movie theaters, typically have a side constructed of sheet metal that exceeds 1000 mm in length. Still further, the enclosure also has terminals for the input of power supply and video signals, and sealing all of the gaps is therefore extremely difficult. Generally, in the technology disclosed in Patent Document 1, not only is the entire device that also includes the duct construction increased in size, but preventing the infiltration of dust and dirt into the surroundings of the optical components and image-generating elements is extremely difficult.

It is an object of the present invention to provide a projection-type display device that not only is provided with a more compact and highly effective heat-dissipating construction and optical engine cooling construction, but that also relatively easily realizes the prevention of infiltration of dust into the optical engine by making the sealed area more compact.

Means for Solving the Problem

The projection-type display device according to the present invention includes:
- a light source;
- a dust-proof case;
- heat-dissipating fins; and
- a heat-dissipation fan that causes inflow of cooling airflow to said heat-dissipating fins, wherein:
- a prism unit, that splits light from said light source into a plurality of illumination light beams, and an internal circulation fan and heat-receiving fins are provided inside said dust-proof case;
- said heat-dissipating fins and said heat-receiving fins are connected by heat pipes, are both substantially rectangular parallelepipeds in shape, and each have a first surface and a second surface whose area is greater than the first surface;
- a cooling airflow inside said dust-proof case that is supplied by said internal circulation fan flows in from said first surface and second surface of said heat-receiving fins; and a cooling airflow that is supplied by said heat-dissipation fan flows in from said second surface of said heat-dissipating fins.

Effect of the Invention

Because the dust-proof case is of the minimum size necessary for containing such components as the optical engine and prism unit, closing the gaps is relatively easy and the infiltration of dust and dirt into the surroundings of the optical components and image-generating elements can be prevented. The space inside the dust-proof case can be made smaller because the cross-section area is small in the direction of flow of the air that passes through the heat-receiving fins. The cross-section area is made larger in the direction of flow of the air that passes through the heat-dissipating fins because the heat-dissipating fins and the heat-dissipation fan are provided outside the dust-proof case, and the heat dissipation is more efficient because higher airflow can be obtained.

BRIEF DESCRIPTION OF THE DRAWINGS

FIGS. 1(a) and (b) are perspective views showing the outer appearance of the first example embodiment of the projection-type display device according to the present invention.

FIGS. 2(a) and (b) are perspective views in which the case is not shown.

FIG. 3(a) is a perspective view showing the internal configuration of the dust-proof case, and 3(b) is a perspective view in which the heat exchanger and heat-dissipation fan are not shown.

FIGS. 4(a) and (b) are perspective views of the prism unit.

FIGS. 9(a) and (b) are views showing the flow of cooling airflow that cools heat-dissipating fins 304 in which a portion of the case is not shown.

EXAMPLE EMBODIMENTS

An example embodiment of the present invention is next described with reference to the accompanying drawings.

First Example Embodiment

Figure 1:
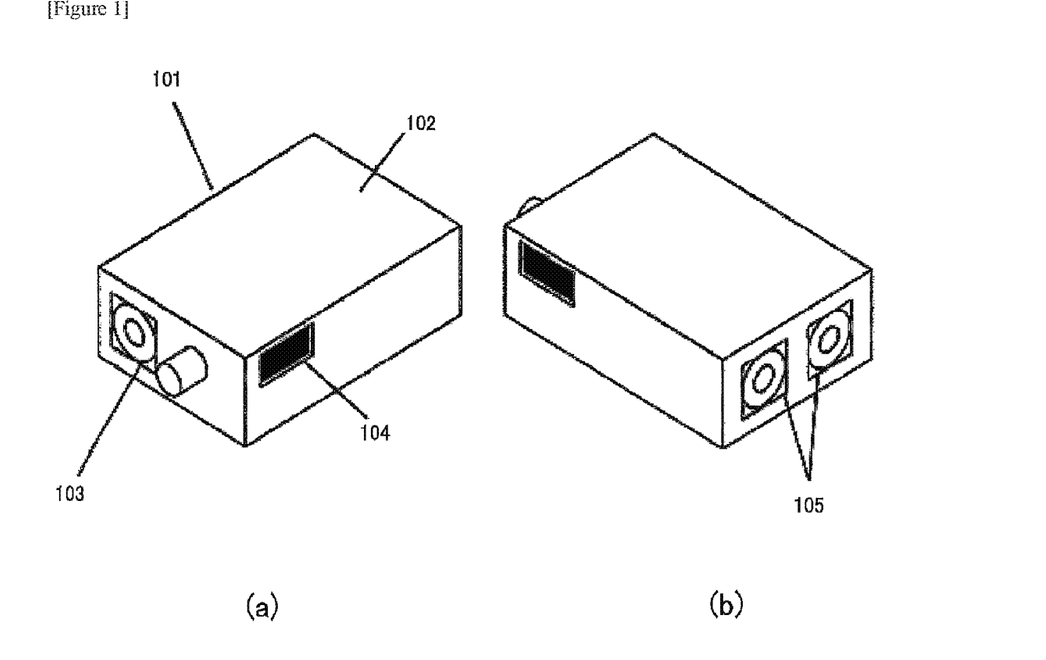
Figure 2:
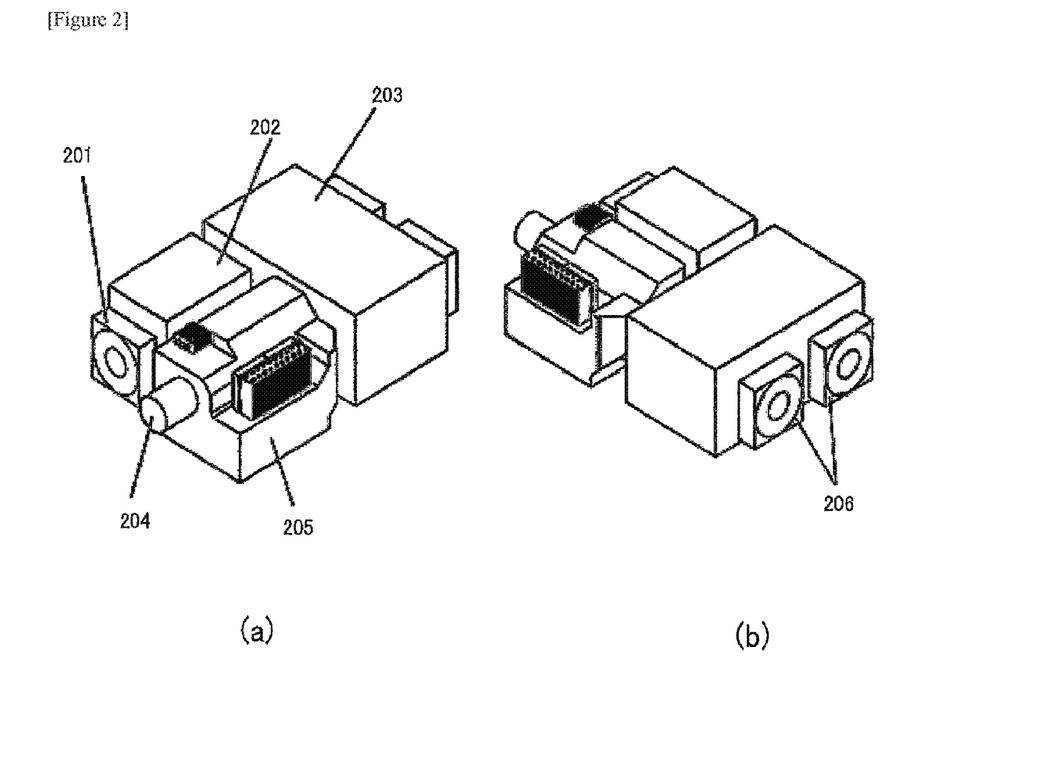
Figure 3:
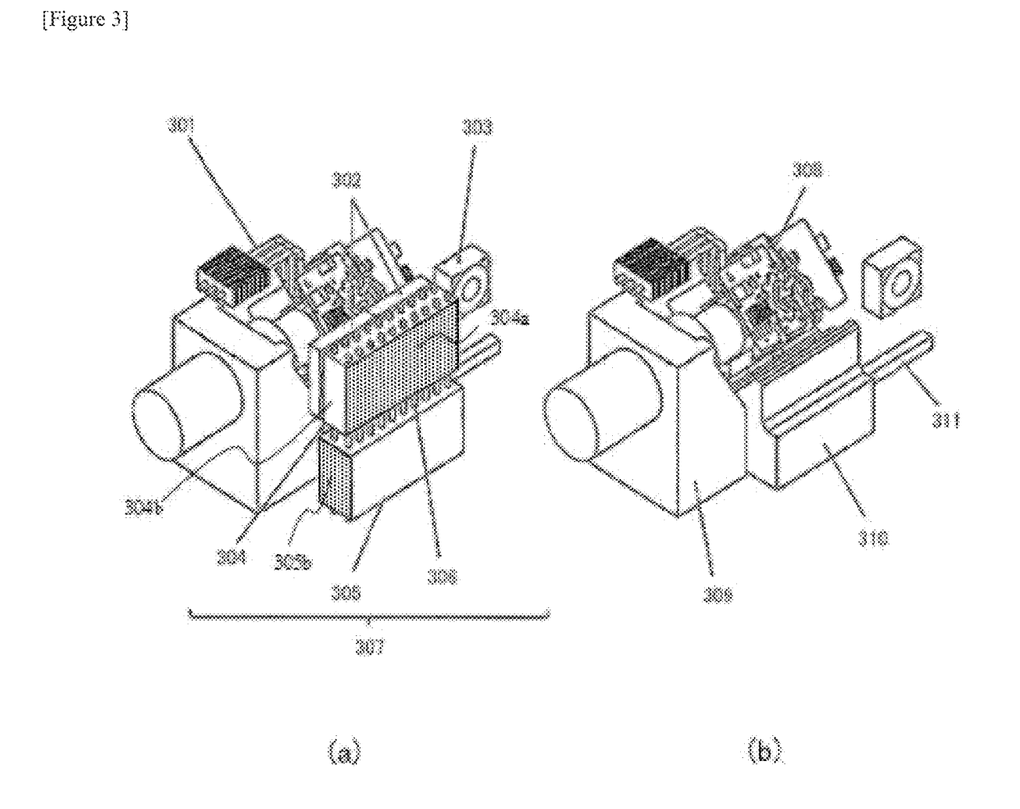
Figure 4:
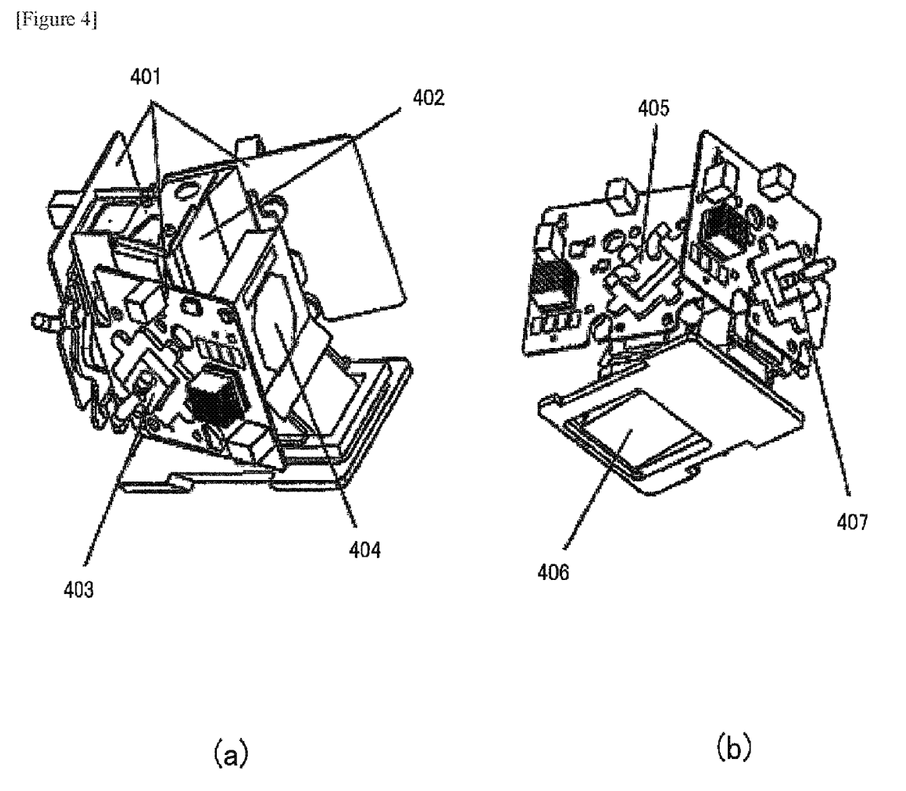
Figure 5:
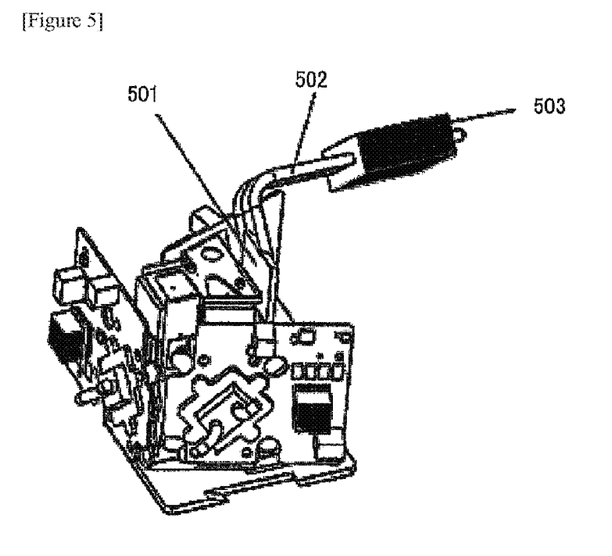
FIG. 5 is a perspective view of a heat sink for unnecessary light.

FIGS. 1 to 5 show the first example embodiment of the projection-type display device according to the present invention, FIGS. 1(a) and (b) being perspective views showing the outer appearance, FIGS. 2(a) and (b) being perspective views in which the case is not shown, FIG. 3(a) being a perspective view showing the internal configuration of the dust-proof case, FIG. 3(b) being a perspective view in which the heat exchanger and heat discharge fan are not shown, FIGS. 4(a) and (b) being perspective views of the prism unit, and FIG. 5 being a perspective view showing the heat sink for unnecessary light.

Projection-type display device 101 shown in FIG. 1 is provided with power supply cooling fan intake port 103, heat-dissipation fan intake port 104, and air exhaust ports 105 in case 102.

Case 102 accommodates light source 203, power supply 202, power supply cooling fan 201, and air exhaust fan 206 that are shown in FIG. 2, and optical engine 310 and internal circulation fan 303 that are shown in FIG. 3. Light source 203, optical engine 310, and power supply 202 are cooled by power supply cooling fan 201 that supplies a cooling airflow, and the air that has cooled these parts and that has risen in temperature is exhausted to the exterior of projection-type display device 101 by air exhaust fan 206.

Power supply cooling fan intake port 103, heat-dissipation fan intake port 104, and air exhaust port 105 that are provided in case 102 are provided for the circulation of the cooling airflow that is generated by power supply cooling fan 201 and air exhaust fan 206 and, although not shown in this description, are originally provided with louvres in a grid-like form for safety and filters for preventing the infiltration of dust.

As shown in FIG. 3, optical components such as prism unit 308 and optical engine 310 that is equipped with, for example, lens mount 309 and mirrors are installed inside dust-proof case 205 shown in FIG. 2 and the light that is emitted from light source 203 forms an optical path up to being projected on a screen.

The adhesion of dust and dirt to optical components inside dust-proof case 205 results in a drop in illuminance and breakdowns, and the prevention of the infiltration of dust and dirt to the vicinity of optical components is therefore achieved by means of dust-proof case 205 that has high airtightness. For the convenience of explanation, the term "light source" refers not only to the lamp or LD that is the light-emitting element but also to optical components such as lenses and mirrors in the vicinity of the light-emitting element. The light source must be enclosed within a structure having high airtightness to prevent the adhesion of dust to the light source, but because the present invention is a configuration that hermetically seals prism unit 308 and optical components in its vicinity by means of compact dust-proof case 205 and that efficiently dissipates the heat inside dust-proof case 205 to outside dust-proof case 205, explanation relating to the adhesion of dust to light source 203 or to the cooling of light source 203 is omitted.

Electric power is supplied to light source 203 from power supply 202, light source 203 emits light, and the light that is emitted from light source 203 enters rod 311. Rod 311 is glass in a square columnar shape. The repeated reflection of the irradiated light on the inner side surfaces of the square column as the light advances results in uniform in-plane intensity distribution and an improvement of the quality of the projected image. In some cases, a light tunnel is used in place of rod 311. In the light tunnel, mirrors are adhered together in a square columnar form and light is reflected by the mirror-coated surfaces.

Light that has passed through rod 311 undergoes optical processing by lenses and mirrors held in optical engine 310 and then enters the incident surface of a prism that is contained in prism unit 308. Due to the characteristics of the optical components and optical design, when passing by way of each component, a portion of the light energy is absorbed by the optical components and surrounding structural parts to generate heat. The present example embodiment uses a prism known as a Philips prism. Light that enters prism incident surface 406 shown in FIG. 4 is white light. The light is separated by the prism into R (red), G (green), and B (blue) illumination light and irradiated into DMDs that are provided for each color and that generate images of each color.

Each DMD is provided with small mirrors that correspond to each pixel of the projected image, and by switching the inclination of each small mirror several thousand times in one second by driving DMD drive substrates 401 that are provided for each DMD, the angle in which the irradiated light is reflected in each pixel is controlled and the light is divided into projected light that is irradiated in a screen shape and unnecessary light that is not projected in a screen shape.

DMDs are not shown in FIG. 4 but are installed on the rear sides of the DMD cooling jackets that are formed on DMD drive substrates 401 of each color. B-DMD cooling jacket 403 for blue is shown in FIG. 4(a), and R-DMD cooling jacket 405 and G-DMD cooling jacket 407 for red and green, respectively, are shown in FIG. 4(b).

Each DMD cooling jacket is liquid-cooled, and although not shown, each DMD cooling jacket is originally linked by a hollow pipe such as a rubber tube.

Of the light that is reflected by the DMD of each color, the projected light is combined by a prism, emitted from projection light emission surface 404, and passes through projection lens 204 to be projected upon a projection surface such as a screen. Of the light that is reflected by the DMD of each color, the unnecessary light is chiefly emitted from unnecessary light-emitting surface 402, but a portion of the unnecessary light is irradiated upon, for example, sheet-metal parts that are adhered to a prism, and the resulting heat is generated inside prism unit 308. The light that is emitted from unnecessary light-emitting surface 402 is irradiated upon unnecessary light-receiving surface 501 of unnecessary light heat sink 301, as shown in FIG. 5. Unnecessary light-receiving surface 501 is preferably subjected to a low-reflectance process, and the light that is received on unnecessary light-receiving surface 501 is absorbed by unnecessary light-receiving surface 501 to become heat. The foregoing is an explanation of the process by which light that is emitted from light source 203 is projected upon a screen or becomes heat in optical components or structural parts.

A plurality of heat-generating parts are present inside dust-proof case 205. For example, there are lenses, mirrors, and prisms that generate heat due to light energy and DMD drive substrates that are electric parts. The heat of these heat-generating parts is dissipated from the heat-generating parts into the air in dust-proof case 205. The heat that is dissipated into the air inside dust-proof case 205 is dissipated to the air outside dust-proof case 205, and moreover, inside projection-type display device 101, and by exhausting the air inside projection-type display device 101 to the outside of projection-type display device 101 by means of power supply cooling fan 201 and air exhaust fan 206, the heat inside dust-proof case 205 is dissipated to the outside of projection-type display device 101.

Nevertheless, as previously described, dust-proof case 205 is provided with the object of preventing the adhesion of dust and dirt to prism unit 308 and its vicinity, and the airtightness must therefore be made high and the ingress and egress of air inside and outside dust-proof case 205 must be eliminated to the utmost. Even if there is no ingress or egress of air inside and outside of dust-proof case 205, heat exchanger 307 is installed in order to efficiently dissipate the heat inside dust-proof case 205 to the outside of dust-proof case 205.

Heat exchanger 307 is made up of a plurality of heat pipes 306, and a plurality of heat-dissipating fins 304 and heat-receiving fins 305 that are formed of thin sheet metal secured to the two ends of heat pipes 306. Heat-receiving fins 305 are arranged in the interior of dust-proof case 205 and heat-dissipating fins 304 are arranged on the exterior of dust-proof case 205. Internal circulation fan 303 that causes circulation of the air inside dust-proof case 205 is installed inside dust-proof case 205. The air that has been blown by internal circulation fan 303 rises in temperature in the process of cooling heat-generating parts inside dust-proof case 205, and the air that has risen in temperature passes by way of heat-receiving fins 305 and is again blown by internal circulation fan 303.

Heat-dissipation fan 302 is installed adjacent to heat-dissipating fins 304 and forms the flow of air before and after heat-dissipation fan 302. By the operation of heat-dissipation fan 302, air is drawn in from heat-dissipation fan intake port 104 that is provided on the side surface of projection-type display device 101, and the cooling airflow realized by the air intake, after having passed by way of heat-dissipating fins 304, flows to the air exhaust side of heat-dissipation fan 302. Unnecessary light heat-dissipating fins 503 of unnecessary light heat sink 301 are arranged on the downstream side of heat-dissipation fan 302, and a portion of the cooling airflow that flows out from heat-dissipation fan 302 further cools unnecessary light heat-dissipating fins 503.

Heat pipes 306 are hollow pipes, hold a liquid inside, and are sealed in a depressurized state. As a result, when the end (heat-receiving end) on which heat-receiving fins 305 are formed becomes hot, the internal liquid receives heat by vaporizing and becoming gas, and the gas moves to the other end (heat-dissipating end) on which heat-dissipating fins 304 are formed. The cooling of the heat-dissipating end causes the gas to return to a liquid state and, by capillarity that occurs due to the wicking action of the minute uneven structure that is provided on the inner walls of the hollow tubes, returns to the heat-receiving end. Heat pipes 306 use the latent heat when the liquid undergoes state change to gas, whereby a large quantity of heat can be conveyed by means of a small amount of liquid, the temperature difference between the heat-receiving end and the heat-dissipating end is extremely small, and heat pipes 306 are known as parts that can efficiently convey heat.

When the air that cools the heat-generating parts inside dust-proof case 205 and that has thus risen in temperature passes by way of heat-receiving fins 305, heat is dissipated from the air to the heat-receiving fins 305 and heat pipes 306. Heat pipes 306 that have received the heat convey the heat to heat-dissipating fins 304 and the heat is dissipated to the cooling airflow by heat-dissipation fan 302. When passing by way of heat-receiving fins 305, the air inside dust-proof case 205 gives off heat to heat-receiving fins 305 and heat pipes 306 and thus decreases in temperature, is circulated by internal circulation fan 303, and then again cools the heat-generating parts inside dust-proof case 205.

Light that is emitted from the unnecessary light-emitting surface of prism unit 308 is irradiated upon unnecessary light-receiving surface 501 that has undergone a blackening process of unnecessary light heat sink 301 to become absorbed heat, and the heat is conveyed to unnecessary light heat-dissipating fins 503 that are arranged on the exterior of dust-proof case 205 by heat pipes 502 that are provided on unnecessary light heat sink 301. Unnecessary light heat-dissipating fins 503 are cooled by a portion of the cooling airflow that is supplied by heat-dissipation fan 302, and as a result, the energy of the light that is emitted from unnecessary light-emitting surface 402 passes by way of unnecessary light heat-receiving surface 501 of unnecessary light heat sink 301, heat pipes 502, and unnecessary light heat-dissipating fins 503 and is then dissipated to the air outside dust-proof case 205. The foregoing is an explanation of the process by which heat inside dust-proof case 205 is efficiently dissipated to the air outside dust-proof case 205.

Figure 6:
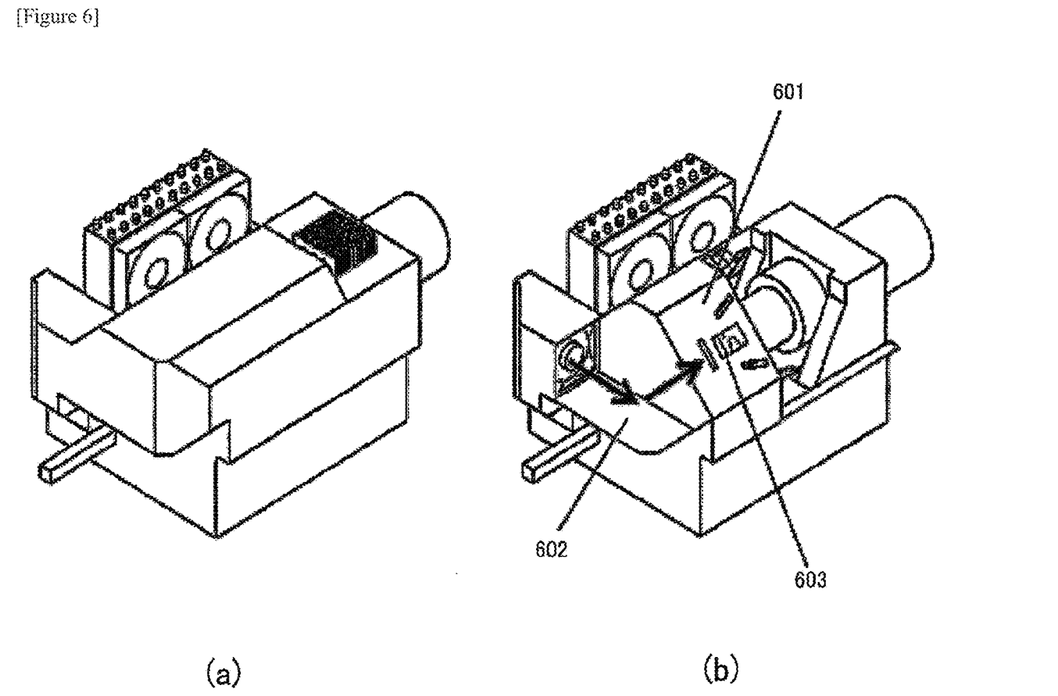
FIG. 6 shows views for describing the flow of air that circulates inside dust-proof case 205, FIG. 6(a) being a perspective view of dust-proof case 205 and FIG. 6(b) being a perspective view in which a portion of the side walls of dust-proof case 205, parts around heat sink 301 for unnecessary light, and projection lens 204 are not shown.

FIG. 6 is a view for describing the flow of air that circulates through the interior of dust-proof case 205, FIG. 6(*a*) being a perspective view of the dust-proof case 205, and FIG. 6(*b*) being a perspective view in which a portion of the side walls of dust-proof case 205, unnecessary light heat sink 301, and the parts around projection lens 204 are not shown.

Figure 7:
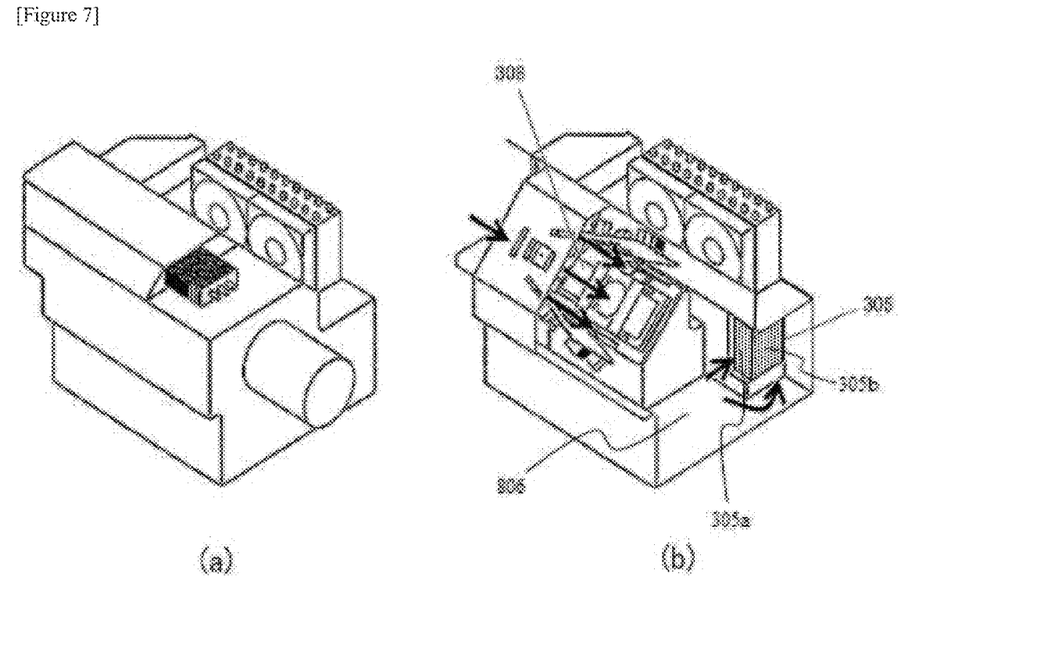
FIG. 7 shows other views for describing the flow of air that circulates inside the dust-proof case, FIG. 7(a) being a perspective view of the dust-proof case as seen from another angle that differs from that of FIG. 6, and FIG. 7(b) being a perspective view in which a portion of the side walls of dust-proof case 205, parts around heat sink 301 for unnecessary light, and projection lens 204 are not shown.

FIG. 7 shows other views for describing the flow of the internal circulating air of the dust-proof case, FIG. 7(*a*) being a perspective view of the dust-proof case as seen from a different angle than in FIG. 6, and FIG. 7(*b*) being a perspective view in which a portion of the side walls of dust-proof case 205, unnecessary light heat sink 301, and parts around projection lens 204 are not shown.

Figure 8:
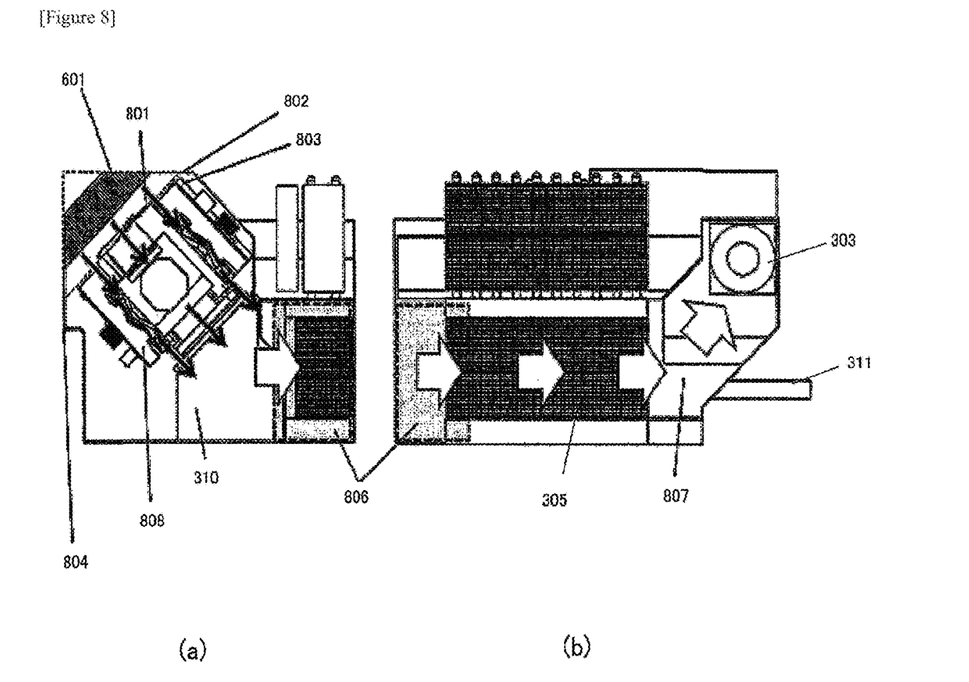
FIG. 8 shows other views for describing the flow of air that circulates inside dust-proof case 205, FIG. 8(a) being a view as seen from the direction of projection lens 204 in which a portion of the side walls of dust-proof case 205, portions around heat sink 301 for unnecessary light, and projector 204 are not shown, and FIG. 8(b) being a view as seen from the direction of heat-dissipation fan intake port 104 in which a portion of the side walls of dust-proof case 205, parts around heat sink 301 for unnecessary light, and projection lens 204 are not shown.

FIG. 8 shows still other views for describing the flow of air that circulates in the interior of dust-proof case 205, FIG. 8(*a*) being a view as seen from the direction of projection lens 204 in which a portion of the side walls of dust-proof case 205, unnecessary light heat sink 301, and the parts around projection lens 204 are not shown, and FIG. 8(*b*) being a view as seen from the direction of heat-dissipation fan intake port 104 in which a portion of the side walls of dust-proof case 205, unnecessary light heat sink 301, parts around projection lens 204, and fin-side surfaces are not shown.

From the viewpoint of transport and installation, the size of projection-type display device 101 is required to be compact. In order to make projection-type display device 101 more compact, reducing the size of the components inside projection-type display device 101 is effective, but reducing the size of optical components also reduces the optical efficiency and leads to a loss of luminance.

In addition, reducing the size of the light source, electric substrate, or fan leads to an increase in the cost of parts due to the use of high-grade parts and an increase of the fan noise that accompanies the increase of the rotational speed of the fan to compensate for the increase in thermal density and the decrease in the amount of airflow that results from reducing the size of the fan openings. As a result, decreasing the size of the space through which the cooling airflow passes and using space that was not used until this time as the space through which the cooling airflow passes are effective for making projection-type display device 101 more compact without causing a decrease in luminance or an increase of the cost and fan noise.

The cooling airflow that is supplied by internal circulation fan 303 flows through prism-cooling duct 602 and flows into prism top-surface duct 601 that is the cooling duct that covers prism unit 308. Prism cooling duct 602 and prism top-surface duct 601 are spaces that are enclosed by surfaces shown in FIG. 6(*b*) and surfaces shown in FIG. 6(*a*) as well as surfaces not shown in FIG. 6(*b*). From the standpoint of optical design characteristics, the bottom surface of prism unit 308 on which prism irradiation surface 406 is formed is installed in a state that is tilted by 45 degrees with respect to the bottom surface of dust-proof case 205.

In the following explanation, the configuration of the present example embodiment is described using the vertical and horizontal directions of the drawing in FIG. 8.

When viewed from the direction of projection lens 204, prism top-surface duct 601 that covers prism unit 308 is made up of: dust-proof case top surface 802 that surrounds the upper side of prism unit 308; dust-proof case side surface 804 that surrounds the left side of the prism unit and that is orthogonal to dust-proof case top surface 802; and a flat surface that is parallel to prism top surface 801 that is tilted 45 degrees.

In addition, internal circulation fan 303 is arranged at a position of the space above rod 311 that is lower than dust-proof case top surface 802 as viewed from the direction of heat-dissipation fan intake port 104. Rod 311 (or a light tunnel) that optically joins light source 203 and optical engine 310 is indispensable from the standpoint of optical design. In order to make the in-plane luminance distribution uniform, light must be reflected a multiplicity of times in the interior of rod 311 and rod 311 must have sufficient length for this purpose. As a result, the space between light source 203 and prism unit 308 and above rod 311 is space that must be produced from the standpoint of optical design, and the space can be effectively used by arranging internal circulation fan 303 and prism cooling duct 602 in this space.

In order to supply airflow from the side of prism top surface 801 to cool prism unit 308, a cooling fan was conventionally installed facing prism top surface 801. In the case of this configuration, space was required above prism top surface 801 for the cooling fan and the air intake of the cooling fan, but because the prism is tilted 45 degrees, both the height and width of the projection-type display device became larger. In the present example embodiment, a configuration is realized in which, by installing prism cooling duct 602 in the space on the side of previously mentioned prism top surface 801, prism top surface duct 601 can be arranged in the interior of the space that, from the standpoint of preventing dust, is required for enclosing prism unit 308, and prism unit 308 can therefore be cooled without increasing the size of the device to secure the space required for cooling.

Prism-substrate cooling opening 603 is provided in prism top-surface duct 601 for supplying a cooling airflow that cools the prism and DMD drive substrates. The position of prism-substrate cooling opening 603 is freely altered according to the site that is required for cooling prism unit 308. This site is not limited to the surface that faces prism top-surface 801, and for example, an opening may be provided in the surface of prism cooling duct 602 that faces G-DMD drive substrate 803, or another duct may be formed and an opening formed in the vicinity of the site of the object of cooling. The cooling airflow that flows into prism-substrate cooling opening 603 flows in from the rear (the side of light source 203) of projection-type display device 101, and because prism-substrate cooling opening 603 is formed in a surface parallel to prism top-surface 801, the cooling airflow that flows out from prism-substrate cooling opening 603 flows out from the front (the side of projection lens 204) of projection-type display device 101, and moreover, in the direction of the lower side surface where heat-dissipation fan intake port 104 is provided.

An inflow opening to optical engine 310 and heat-receiving fins 305 is present in the direction of the outflow of the cooling airflow from prism-substrate cooling opening 603, and the cooling airflow flows without hindrance. The cooling airflow that has cooled prism unit 308 cools the lenses, mirrors, and holding structure that make up optical engine 310 and then flows into heat-receiving fins 305. Before flowing into heat-receiving fins 305, pre-heat-receiving fin space 806 is necessary for the passage of the cooling airflow. If pre-heat-receiving fin space 806 is narrow, the loss of pressure increases, the amount of cooling airflow decreases, the utilization efficiency of heat-receiving fins 305 and heat pipes 306 decreases as the cooling airflow fails to flow to all of heat-receiving fins 305, and the cooling performance inside dust-proof case 205 as well as the heat dissipation performance that dissipates heat inside dust-proof case 205 to the outside both decrease.

As shown in FIG. 7(b), the provision of pre-heat-receiving fin space 806 causes the cooling airflow that has passed through prism unit 308 to flow into heat-receiving fins 305 from a first surface 305a of heat-receiving fins 305 that is on the side of prism unit 308 and a portion of a second surface 305b that is substantially orthogonal to the first surface 305a. When the first surface 305a of heat-receiving fins 305 that is on the side of prism unit 308 is blocked, the loss of pressure of the flow paths in dust-proof case 205 increases and the amount of cooling airflow drops. When the second surface 305b of heat-receiving fins 305 is blocked, the loss of pressure of flow paths in dust-proof case 205 increases, and not only does the amount of cooling airflow fall, but the amount of circulation of the cooling airflow from the side surface that is on the side of heat-dissipation fan intake port 104 of the heat-receiving fins 305 diminishes and the utilization efficiency of heat-receiving fins 305 and heat pipes 306 is reduced.

Depending on the performance of heat exchanger 307 and the amount of generated heat inside dust-proof case 205, cooling can still be achieved without problems even should one surface be blocked, but providing pre-heat-receiving fin space 806 and causing the cooling air to flow into heat-receiving fins 305 from the two surfaces of heat-receiving fins 305 as in the present example embodiment enables an improvement of the cooling performance and heat dissipation performance.

In addition, from the viewpoint of the increase of pressure loss, the area of pre-heat-receiving fin space 806 through which the cooling airflow passes is preferably greater than the cross-section area in the direction of flow of the cooling airflow between heat-receiving fins 305. However, if pre-heat-receiving fin space 806 is narrow and the area through which the cooling airflow flows into heat-receiving fins 305 from the first surface 305a of the heat-receiving fins, where prism unit is present, is made too large, cooling airflow will not flow to the side surfaces of the heat-dissipation fan intake port 104-side of heat-receiving fins 305 or to the region of the second surface 305b, and the efficiency of the heat exchanger will be reduced. Special care should therefore be taken regarding this point.

Heat-receiving fins 305 and heat-dissipating fins 304 are formed from thin sheet metal (fins) as previously described, and more specifically, are arranged such that a plurality of plate-like fins are parallel, and moreover, at a fixed spacing. In the smallest rectangular parallelepiped that contains heat-receiving fins 305, the surfaces that are effective in cooling the cooling airflow that passes are the four surfaces that are perpendicular to the direction of arrangement of the fins that make up heat-receiving fins 305, and the above-described first surface 305a and second surface 305b are included in these four surfaces. In the present example embodiment, the adoption of a configuration in which the cooling airflow flows from the direction that is perpendicular to, of the four surfaces that are effective in cooling, the second surface 305b that is the smallest in area realizes a configuration that can minimize the volume of pre-heat-receiving fin space 806 and guarantee the necessary and sufficient capacity. In addition, the arrangement of pre-heat-receiving fin space 806 in the space that is enclosed by lens mount 309 and the vicinity of the ridgelines of the corners of case 102, which was conventionally dead space, enables effective use of the space.

When cooling air flows through heat-receiving fins 305, the dissipation of heat to heat-receiving fins 305 and heat pipes 306 causes the temperature of the cooling airflow to drop. The cooling airflow then passes through post-heat-receiving fin space 807, returns to internal circulation fan 303, and is again sent to prism-cooling duct 602. In the present example embodiment, a configuration is adopted in which, in the smallest rectangular parallelepiped that contains heat-receiving fin 305, cooling air flows from a direction that is perpendicular to, of the four surfaces that are effective in cooling and that are inflow surfaces of the cooling airflow that are effective in heat dissipation or heat reception, the surface having the smallest area. As a result, the cross-section area of the flow path of post-heat-receiving fin space 807 can be made small and the volume of post-heat-receiving fin space 807 can also be made small without increasing pressure loss.

Figure 9:
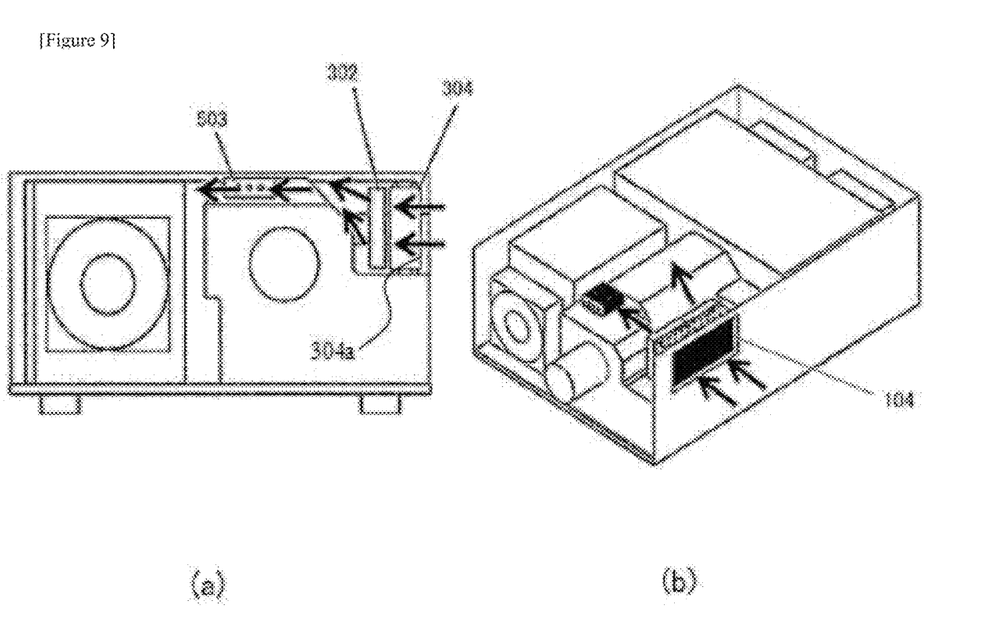

FIGS. 9(a) and (b) show the flow of the cooling air that cools heat-dissipating fins 304 in which portions of the case are not shown.

By driving heat-dissipation fan 302, air flows in from heat-dissipation fan intake port 104 that is provided in a side surface of case 102, passes through heat-dissipating fins 304, and is supplied into projection-type display device 101 by means of heat-dissipation fan 302. The surfaces that are effective for dissipating heat to the passing cooling airflow in the smallest rectangular parallelepiped that contains heat-dissipating fins 304 are the four surfaces that are perpendicular to the direction of arrangement of the fins that make up heat-dissipating receiving fins 304. Heat-dissipation fan 302 is installed so as to be adjacent and parallel to, of surfaces, a surface 304a having the largest area. The adoption of a configuration in which the cooling airflow of heat-dissipating fins 304 flows in a direction perpendicular to this surface allows the installation of a large-sized fan that can guarantee the amount of the cooling airflow of heat-dissipating fins 304 even at low rotational speed and low noise, and heat can be efficiently dissipated.

By supplying heat-dissipating fin cooling airflow that flows in from heat-dissipation fan intake port 104 and that is supplied in parallel to heat pipes 306 that are provided from upstream to downstream in the direction of the flow of heat-receiving fins 305, the temperature of the heat-dissipating fin cooling airflow that cools heat pipes 306 that are provided from upstream to downstream and heat-dissipating fins 304 becomes identical. In addition, since the temperature of the heat-dissipating fin cooling airflow is the air temperature outside projection-type display device 101 that is the lowest air temperature that can cool projection-type display device 101, the cooling performance of cooling heat-dissipating fins 304 increases, and the heat dissipation efficiency also increases.

The arrangement of heat-dissipating fins 304 and heat-dissipation fan 302 is not limited to the configuration shown in FIG. 9(a), and a configuration is also possible in which the heat-dissipating-fin cooling airflow flows in the order of heat-dissipation fan intake port 104, heat-dissipation fan 302, and heat-dissipating fins 304. In addition, the central portion of heat-dissipating fins 304 may be eliminated, and by arranging heat-dissipation fan 302 in the space created by this elimination, a configuration may be adopted in which the heat-dissipating-fin cooling airflow flows in the order of heat-dissipation fan intake port 104, heat-dissipating fins 304, heat-dissipation fan 302, and heat-dissipating fins 304.

A portion of the heat-dissipating-fin cooling airflow that is supplied into projection-type display device 101 by heat-dissipation fan 302 cools unnecessary light heat-dissipating fins 503 that are positioned on the downstream side of heat-dissipation fan 302. The light energy of unnecessary light inside dust-proof case 205 is heat-dissipated by unnecessary light heat sink 301 that is separate from heat exchanger 307, and as a result, the amount of heat dissipation realized by heat exchanger 307 can be decreased and the temperature rise of the air in dust-proof case 205 can be reduced. In addition, even when unnecessary light heat sink 301 is not used, unnecessary light-receiving surface 501 must be provided inside dust-proof case 205 from the viewpoint of eliminating stray light, and cooling airflow is necessary for cooling unnecessary light-receiving surface 501. In the present example embodiment, a portion of the cooling airflow that is supplied by internal circulation fan 303 is used for cooling unnecessary light-receiving surface 501, and the performance of cooling the prism or DMD drive substrate 401 therefore decreases. To compensate for this, the provision of unnecessary light heat sink 301 both reduces the rise in temperature inside dust-proof case 205 and maintains sufficient cooling performance of the prism and DMD drive substrate 401.

Unnecessary light heat-dissipating fins 503 are provided in the space above lens mount 309. This is space that was conventionally not used, and here, the space is effectively used. In addition, by adopting an arrangement such that unnecessary light heat-dissipating fins 503 form the same surface as dust-proof case top surface 802, the provision of unnecessary light heat sink 301 does not result in an increase of the size of projection-type display device 101.

By forming duct-shaped wall surfaces between heat-dissipation fan 302 and unnecessary light heat-dissipating fins 503, the heat-dissipating fin cooling airflow that flows out from heat-dissipation fan 302 can be guided to unnecessary light heat-dissipating fins 503, the amount of airflow that cools unnecessary light heat-dissipating fins 503 is increased, and the heat dissipation performance of unnecessary light heat sink 301 is augmented. Unnecessary light heat-dissipating fins 503 are installed in positions that are remote from heat-dissipation fan 302, and as a result, a small distance between fins causes an increase of pressure loss and impedes the flow of the heat-dissipating fin cooling airflow between fins, and as a result, the distance between fins of unnecessary light heat-dissipating fins 503 is preferably wider than the distance between fins of heat-dissipating fins 304 of heat exchanger 307. In order to explain the arrangement, for example, FIG. 3 shows a state of arrangement having gaps in the outer periphery of heat-dissipation fan intake port 104, heat-dissipating fins 304, and heat-dissipation fan 302. When the gaps are present, the air that has risen in temperature in projection-type display device 101 flows between heat-dissipating fins and the amount of heat-dissipating fin cooling airflow that flows to heat-dissipating fins 304 decreases by being drawn in from the gaps, and as a result, the gaps of the outer periphery of heat-dissipation fan intake port 104, heat-dissipating fins 304, heat-dissipation fan 302 are preferably plugged by the duct-shaped construction.

In the configuration of the present example embodiment, the direction of flow of the air that flows through heat-receiving fins 305 is a direction perpendicular to the second surface 305b that is the smallest in area among surfaces (305a, 305b) perpendicular to the direction of fin arrangement in the smallest rectangular parallelepiped that contains heat-receiving fins 305, and the direction of flow of air that flows through the heat-dissipating fins is a direction perpendicular to the surface 304a that is the greatest in area among surfaces (304a, 304b) that are perpendicular to the direction of arrangement of fins in the smallest rectangular parallelepiped that contains heat-dissipating fins 304, and as a result, the direction of flow of the air that flows through heat-receiving fins 305 and the direction of flow of air that flows through heat-dissipating fins 304 are in a 90-degree twisted directional relationship.

The air that flows to heat-receiving fins 305 is generated by internal circulation fan 303 that is installed inside dust-proof case 205, but as described above, the space and the cross-section area of the flow path through which the air flows can be made smaller, whereby dust-proof case 205 and projection-type display device 101 that accommodates dust-proof case 205 can be made more compact.

In addition, heat-dissipating fins 304 or heat-dissipation fan 302 is placed adjacent to case 102 and the cross-section area of the direction of flow of air that flows through heat-dissipating fins 304 therefore increases, and as a result, the need to provide space for air intake inside projection-type display device 101 is eliminated, and based on this point as well, the projection-type display device can be made more compact. In addition, because heat-dissipation fan 302 can be made larger, higher airflow can be obtained and the heat dissipation effect is good. Apart from heat exchanger 307 that receives heat from the air that flows inside dust-proof case 205 and dissipates the heat to the outside of dust-proof case 205, the provision of unnecessary light heat sink 301 that receives light, converts the light to heat, and dissipates the heat to the outside of dust-proof case 205 enables heat inside dust-proof case 205 to be dissipated with still greater efficiency. The compact size of dust-proof case 205 facilitates the task of blocking gaps that link the interior and exterior of dust-proof case 205 and that can occur in the assembly process, thereby both enabling prevention of the infiltration of dust and dirt into the vicinity of optical components and image-generating elements and enabling reduction of the enlargement of projection-type display device 101. Generally, the configuration of the present example embodiment can realize the prevention of infiltration of dust into an optical engine with relative ease due to the small hermetically sealed area, and further, has a heat-dissipation construction and a cooling structure of an optical engine that are compact and highly efficient.

EXPLANATION OF REFERENCE NUMBERS

101 projection-type display device
102 case
203 light source
205 dust-proof case
304 heat-dissipating fins
305 heat-receiving fins
306 heat pipe
308 prism unit

The invention claimed is:
1. A projection display device comprising:
a light source;
a dust-proof case that includes an optical component, an internal circulation fan and heat-receiving fins, said optical component being configured to form an optical path including light that is emitted from said light source;
heat-dissipating fins that are connected by heat pipes; and
a heat-dissipation fan, directly attached to the heat-dissipating fins, that supplies airflow to said heat-dissipating fins,
wherein:
said heat-dissipating fins and said heat-receiving fins are both substantially rectangular parallelepipeds in shape, and each has a first surface and a second surface whose area is less than the first surface;
said first surface and said second surface of said heat-receiving fins face a space that is provided in dust-proof case;
said internal circulation fan supplies airflow to said first surface and second surface of said heat-receiving fins; and
said heat-dissipation fan supplies airflow to said second surface of said heat-dissipating fins,
further comprising:
an unnecessary light receiving surface that is provided at a position irradiated by unnecessary light inside said dust proof case; and
unnecessary light heat-dissipating fins that are provided outside said dust-proof case that is a position that receives cooling airflow realized by said heat-dissipation fan and that are connected with said unnecessary light-receiving surface by way of heat pipes.

2. The projection display device as set forth in claim 1, wherein said heat-dissipation fan is set adjacent to said heat-dissipating fins.
3. The projection display device as set forth in claim 1, further comprising:
a plurality of image-forming elements that are provided inside said dust-proof case and that are provided corresponding to each of a plurality of illumination light beams that are split by a prism unit.
4. The projection display device as set forth in claim 3, wherein said plurality of image-forming elements comprise Digital Micro-mirror Devices (DMDs).
5. The projection display device as set forth in claim 1, further comprising:
an optical engine that is provided inside said dust-proof case and includes mirrors and lenses that guide light from said light source to a prism unit.
6. The projection display device as set forth in claim 1, further comprising:
a cooling duct that covers a prism unit; and
a cooling opening that is provided in said cooling duct and that blows cooling airflow supplied by said internal circulation fan toward DB said prism unit.
7. The projection display device as set forth in claim 1, wherein said airflow from said heat-dissipation fan is supplied to a surface having a largest area.
8. The projection display device as set forth in claim 1, wherein said airflow from said heat-dissipation fan is supplied in parallel to said heat pipes.
9. The projection display device as set forth in claim 1, wherein the heat-dissipation fan is installed adjacent and parallel to a surface of the heat-dissipating fins having a largest area from among the surfaces of said rectangular parallelepiped.
10. The projection display device as set forth in claim 1, wherein surfaces of the heat-dissipating fins having a largest area are the surfaces that are perpendicular to a direction of arrangement of the fins that make up the heat-receiving fins.
11. The projection display device as set forth in claim 1, wherein the heat-dissipation fan is arranged in a central portion of the heat-dissipating fins.
12. The projection display device as set forth in claim 11, wherein a configuration is adopted in which the heat-dissipating-fin cooling airflow flows in an order of a heat-dissipation fan intake port, the heat-dissipating fins, the heat-dissipation fan, and the heat-dissipating fins.
13. The projection display device as set forth in claim 1, wherein the heat-dissipation fan is directly attached to the first surface of the heat-dissipating fin to provide airflow in a direction perpendicular to the first surface.
14. The projection display device as set forth in claim 1, wherein a plane of the second surface is parallel to the airflow of the heat-dissipation fan, and
wherein a plane of the first surface is perpendicular to the airflow of the heat-dissipation fan.
15. A projection display device comprising:
a light source;
a dust-proof case;
heat-dissipating fins; and
a heat-dissipation fan that causes inflow of cooling airflow to said heat-dissipating fins,
wherein:
a prism unit, that splits light from said light source into a plurality of illumination light beams, and an internal circulation fan and heat-receiving fins are provided inside said dust-proof case;

said heat-dissipating fins and said heat-receiving fins are connected by heat pipes, are both substantially rectangular parallelepipeds in shape, and each have a first surface and a second surface whose area is greater than the first surface;

a cooling airflow inside said dust-proof case that is supplied by said internal circulation fan flows in from said first surface and second surface of said heat-receiving fins; and a cooling airflow that is supplied by said heat-dissipation fan flows in from said second surface of said heat-dissipating fins, further comprising:

an unnecessary light receiving surface that is provided at a position irradiated by unnecessary light inside said dust-proof case; and unnecessary light heat-dissipating fins that are provided outside said dust-proof case that is a position that receives cooling airflow realized by said heat-dissipation fan and that are connected with said unnecessary light-receiving surface by way of heat pipes.

* * * * *

UNITED STATES PATENT AND TRADEMARK OFFICE
CERTIFICATE OF CORRECTION

PATENT NO. : 11,009,782 B2
APPLICATION NO. : 16/324531
DATED : May 18, 2021
INVENTOR(S) : Eisuke Yamashita Page 1 of 1

It is certified that error appears in the above-identified patent and that said Letters Patent is hereby corrected as shown below:

In the Claims

In Column 13, Lines 57-58: replace "said heat-dissipation fan supplies airflow to said second surface of said heat-dissipating fins" with "said heat-dissipation fan supplies airflow to said first surface of said heat-dissipating fins"

Signed and Sealed this
Tenth Day of August, 2021

Drew Hirshfeld
*Performing the Functions and Duties of the*
*Under Secretary of Commerce for Intellectual Property and*
*Director of the United States Patent and Trademark Office*